US009963986B2

(12) United States Patent
Yagi et al.

(10) Patent No.: US 9,963,986 B2
(45) Date of Patent: May 8, 2018

(54) COUPLING PART STRUCTURE FOR VANE AND JET ENGINE INCLUDING THE SAME

(71) Applicant: IHI Corporation, Tokyo (JP)

(72) Inventors: Hiroyuki Yagi, Tokyo (JP); Tadahiro Ishigure, Tokyo (JP); Takaomi Inada, Tokyo (JP); Takeshi Murooka, Tokyo (JP); Hideo Morita, Tokyo (JP); Tatsuhito Honda, Tokyo (JP)

(73) Assignee: IHI CORPORATION, Tokyo (JP)

( * ) Notice: Subject to any disclaimer, the term of this patent is extended or adjusted under 35 U.S.C. 154(b) by 440 days.

(21) Appl. No.: 14/375,556

(22) PCT Filed: Feb. 1, 2013

(86) PCT No.: PCT/JP2013/052320
§ 371 (c)(1),
(2) Date: Nov. 7, 2014

(87) PCT Pub. No.: WO2013/115349
PCT Pub. Date: Aug. 8, 2013

(65) Prior Publication Data
US 2015/0064000 A1  Mar. 5, 2015

(30) Foreign Application Priority Data
Feb. 2, 2012 (JP) .................. 2012-021256

(51) Int. Cl.
*F01D 9/04* (2006.01)
*F01D 5/28* (2006.01)
(Continued)

(52) U.S. Cl.
CPC ............. *F01D 9/042* (2013.01); *F01D 5/282* (2013.01); *F01D 25/162* (2013.01); *F02C 7/20* (2013.01);
(Continued)

(58) Field of Classification Search
CPC .... F01D 9/042; F01D 25/246; F05D 2260/36; Y02T 50/672
See application file for complete search history.

(56) References Cited

U.S. PATENT DOCUMENTS

| 4,249,859 A | 2/1981 | Benyi, Jr. et al. |
| 5,320,490 A | 6/1994 | Corbin et al. |

(Continued)

FOREIGN PATENT DOCUMENTS

| EP | 1548233 A1 | 6/2005 |
| EP | 1777377 A2 | 4/2007 |

(Continued)

OTHER PUBLICATIONS

Parker, D., Bussink, J., van de Grampel, H. T., Wheatley, G. W., Dorf, E.-U., Ostlinning, E. and Reinking, K. 2000. Polymers, High-Temperature. Ullmann's Encyclopedia of Industrial Chemistry.*

(Continued)

*Primary Examiner* — Richard Edgar
*Assistant Examiner* — John S Hunter
(74) *Attorney, Agent, or Firm* — Volpe & Koenig, P.C.

(57) ABSTRACT

A coupling support member including a pair of divided pieces is placed between an end portion of a guide vane and an attachment flange, and the pair of divided pieces is joined to the vane end portion from both sides in the vane thickness direction. A linear protrusion is formed on one of joint surfaces of the vane end portion. A groove engaged with the linear protrusion is formed in one of respective joint surfaces of the pair of divided pieces. The vane end portion is fastened between the pair of divided pieces. It is possible to obtain a high structural strength while contributing to a reduction in weight of a jet engine.

2 Claims, 6 Drawing Sheets

(51) Int. Cl.
*F02C 7/20* (2006.01)
*F01D 25/16* (2006.01)
*F01D 25/24* (2006.01)

(52) U.S. Cl.
CPC ........ *F01D 25/246* (2013.01); *F05D 2260/31* (2013.01); *F05D 2260/36* (2013.01); *Y02T 50/672* (2013.01); *Y02T 50/673* (2013.01)

(56) References Cited

U.S. PATENT DOCUMENTS

| | | | | |
|---|---|---|---|---|
| 8,734,101 | B2* | 5/2014 | McDonald | F01D 9/042 |
| | | | | 415/209.4 |
| 8,926,262 | B2* | 1/2015 | Tanahashi | F01D 5/282 |
| | | | | 415/200 |
| 9,228,446 | B2* | 1/2016 | Samuelsson | F01D 9/042 |
| 2012/0009071 | A1* | 1/2012 | Tanahashi | F01D 5/282 |
| | | | | 416/241 B |

FOREIGN PATENT DOCUMENTS

| | | | |
|---|---|---|---|
| FR | 2958680 A1 | 10/2011 | |
| JP | 05-149148 A | 6/1993 | |
| JP | 2000-204669 A | 7/2000 | |
| JP | 2001-020392 A | 1/2001 | |
| WO | 2008/121047 A1 | 10/2008 | |
| WO | WO 2011053197 A1 * | 5/2011 | ............. F01D 9/042 |

OTHER PUBLICATIONS

International Search Report, PCT/JP2013/052320, dated Feb. 14, 2013, 2 pgs.
Extended European Search Report, European Patent Application No. 13743758.8, dated Sep. 29, 2015, 5 pgs.

\* cited by examiner

COUPLING PART STRUCTURE FOR VANE AND JET ENGINE INCLUDING THE SAME

TECHNICAL FIELD

The present invention relates to, for example, a coupling part structure for a vane used for a coupling part to an engine main body, of guide vanes that are vanes constituting an aircraft jet engine, and a jet engine including the coupling part structure for the vane.

BACKGROUND ART

Such a jet engine as described above is normally provided with: rotor blades for introducing air into an engine main body; and guide vanes that are stator vanes for controlling a flow of the air introduced by the rotor blades.

The guide vanes may be required to have only the flow controlling function, and may be required to also have a structural function of coupling a fan frame and a fan case constituting the engine main body, in addition to the flow controlling function.

In the former case where the guide vanes are required to have only the flow controlling function, a metal material such as an aluminum alloy or a composite material of thermosetting resin such as epoxy resin and reinforcement fiber such as carbon fiber is normally adopted as the constituent material of each guide vane, and a strut that is placed downstream of the guide vanes and is made of a metal material such as an aluminum alloy as its constituent material is provided with the structural function. Meanwhile, in the case where the guide vanes are required to also have the structural function in addition to the flow controlling function, a metal material such as an aluminum alloy is adopted as the constituent material of each guide vane.

Such guide vanes as described above and a jet engine including the guide vanes are described in, for example, Patent Documents 1 to 3.

PRIOR ART DOCUMENT

Patent Document

Patent Document 1: U.S. Pat. No. 5,320,490
Patent Document 2: Japanese Patent No. 2766423
Patent Document 3: Japanese Patent Laid-Open No. 05-149148

SUMMARY OF THE INVENTION

Problems to be Solved by the Invention

Here, in response to a demand of recent years for a higher bypass ratio for the purpose of enhancing the fuel efficiency of an aircraft jet engine, the engine diameter tends to be made larger. Along with this, the weight of the aircraft jet engine needs to be urgently reduced.

For example, in the case where the guide vanes are provided with only the flow controlling function, the weight of each guide vane itself can be reduced by an amount corresponding to using the composite material as its constituent material, whereas the reduction in weight of the aircraft jet engine is prevented by an amount corresponding to assigning the structural function to the strut that is made of the metal material such as the aluminum alloy as its constituent material.

On the other hand, in the case where the guide vanes are provided with the structural function in addition to the flow controlling function, the metal material such as the aluminum alloy is used as the constituent material of each guide vane, and hence the reduction in weight of the aircraft jet engine is prevented, which is the same problem as that in the case of using the strut. This is a conventional problem to be solved.

The present invention, which has been made in view of the above-mentioned conventional problem, has an object to provide a coupling part structure for a vane capable of obtaining a high structural strength while contributing to a reduction in weight of a jet engine, and a jet engine including the coupling part structure for the vane.

Means for Solving the Problems

In order to achieve the above object, the present invention provides a coupling part structure for a vane that constitutes a jet engine and is made of a composite material of thermosetting resin or thermoplastic resin and reinforcement fiber, the coupling part structure including a vane coupling part. The vane coupling part includes a coupling support member placed therein, the coupling support member being made of metal and including a pair of divided pieces separated from each other, the pair of divided pieces being joined to an end portion of the vane from both sides in a vane thickness direction. At least any one of joint surfaces of the end portion of the vane to the pair of divided pieces has at least one linear protrusion or groove formed thereon. At least any one of respective end joint surfaces of the pair of divided pieces of the coupling support member has a groove or linear protrusion formed thereon, the groove or linear protrusion being engaged with the linear protrusion or groove formed in the end portion of the vane. The end portion of the vane is held between the pair of divided pieces of the coupling support member, by fastening force (for example, fastening force obtained by bolts and nuts) that is applied to the pair of divided pieces of the coupling support member from both the sides in the vane thickness direction.

Preferably, an adhesive is interposed between the pair of divided pieces of the coupling support member and the end portion of the vane held between the pair of divided pieces.

The present invention further provides a jet engine including the above-mentioned coupling part structure for the vane as a coupling part structure for a vane constituting the jet engine.

Here, the coupling part structure for the vane according to the present invention can be applied to: a coupling part between a vane distal end portion of a guide vane that is a stator vane of a jet engine and an engine main body; and a coupling part between a vane proximal end portion of, similarly, the guide vane and the engine main body, and can also be applied to: a coupling part between a tip (distal end portion) of a rotor blade of the jet engine and a tip shroud; and a coupling part between a hub (proximal end portion) of, similarly, the rotor blade and a shaft. Note that the tip shroud is provided to the tip of the rotor blade for the purpose of vibration prevention and aerodynamic performance improvement, and rotates together with the rotor blade.

In the coupling part structure for the vane according to the present invention, the number of the linear protrusions or grooves formed on the joint surface(s) of the end portion of the vane to the coupling support member (the number of the grooves or linear protrusions formed on the end joint surface(s) of the coupling support member) is not limited to one, regardless of whether the linear protrusions or grooves are provided on only one of the joint surfaces or on both of one joint surface and another joint surface. For example, two linear protrusions or grooves may be provided on both of one joint surface and another joint surface. Alternatively, one linear protrusion or groove may be provided on one joint surface, and two linear protrusions or grooves may be provided on another joint surface.

Further, in the coupling part structure for the vane according to the present invention, the linear protrusions or grooves formed on the joint surface(s) of the end portion of the vane to the coupling support member (the grooves or linear protrusions formed on the end joint surface(s) of the coupling support member) can be trapezoidal, semicircular, triangular, and rectangular in cross-section, but are not limited to these shapes.

Moreover, in the coupling part structure for the vane according to the present invention, examples of the thermosetting resin usable to form the vane include epoxy resin, phenolic resin, and polyimide resin, and examples of the thermoplastic resin usable to form, similarly, the vane include polyetherimide, polyether ether ketone, and polyphenylene sulfide. Then, examples of the reinforcement fiber usable to form the vane include carbon fiber, aramid fiber, and glass fiber. The vane is formed by, for example, laminating the composite material of these substances in the vane thickness direction or three-dimensionally inweaving the composite material thereof. Meanwhile, metal such as an aluminum alloy and a titanium alloy can be used to form the coupling support member.

In the coupling part structure for the vane according to the present invention, first, the end portion of the vane made of the composite material is located between respective opposed walls of the pair of divided pieces of the coupling support member made of the metal. Further, the linear protrusion or groove formed on at least any one of the joint surfaces of the end portion of the vane to the coupling support member is engaged with the groove or linear protrusion formed on at least any one of the end joint surfaces of the coupling support member. In this state, for example, the fastening force obtained by the bolts and the nuts is applied to the pair of divided pieces of the coupling support member from both the sides in the vane thickness direction, whereby the end portion of the vane is held between the pair of divided pieces of the coupling support member.

Accordingly, the coupling part structure for the vane according to the present invention is capable of obtaining a high structural strength while contributing to a reduction in weight of the jet engine. In addition, because the coupling strength is a mechanical coupling strength, process management for the coupling part is facilitated compared with the coupling strength in the case of using only an adhesive.

Further, because the end portion of the vane is sandwiched between the pair of divided pieces from both the sides in the vane thickness direction, a turn of the end portion of the vane can be avoided compared with, for example, the case where the end portion of the vane is supported by only one of the divided pieces. As a result, a strong coupling state can be maintained.

Moreover, at the time of assembling of the end portion of the vane and the coupling support member, the linear protrusion or groove in the end portion of the vane is engaged with the groove or linear protrusion in the coupling support member, whereby the two components are positioned with each other. Accordingly, this assembling work is facilitated.

Still further, in the coupling part structure for the vane according to the present invention, if the adhesive is interposed between the pair of divided pieces of the coupling support member and the end portion of the vane held between the pair of divided pieces, a higher structural strength can be obtained.

Meanwhile, the jet engine according to the present invention adopts the coupling part structure for the vane according to the present invention, to thereby achieve both a reduction in weight and an increase in strength.

Advantageous Effects of the Invention

A coupling part structure for a vane according to the present invention produces an excellent effect of obtaining a high structural strength while contributing to a reduction in weight of a jet engine.

MODE FOR CARRYING OUT THE INVENTION

Hereinafter, the present invention is described with reference to the drawings.

Figure 1:
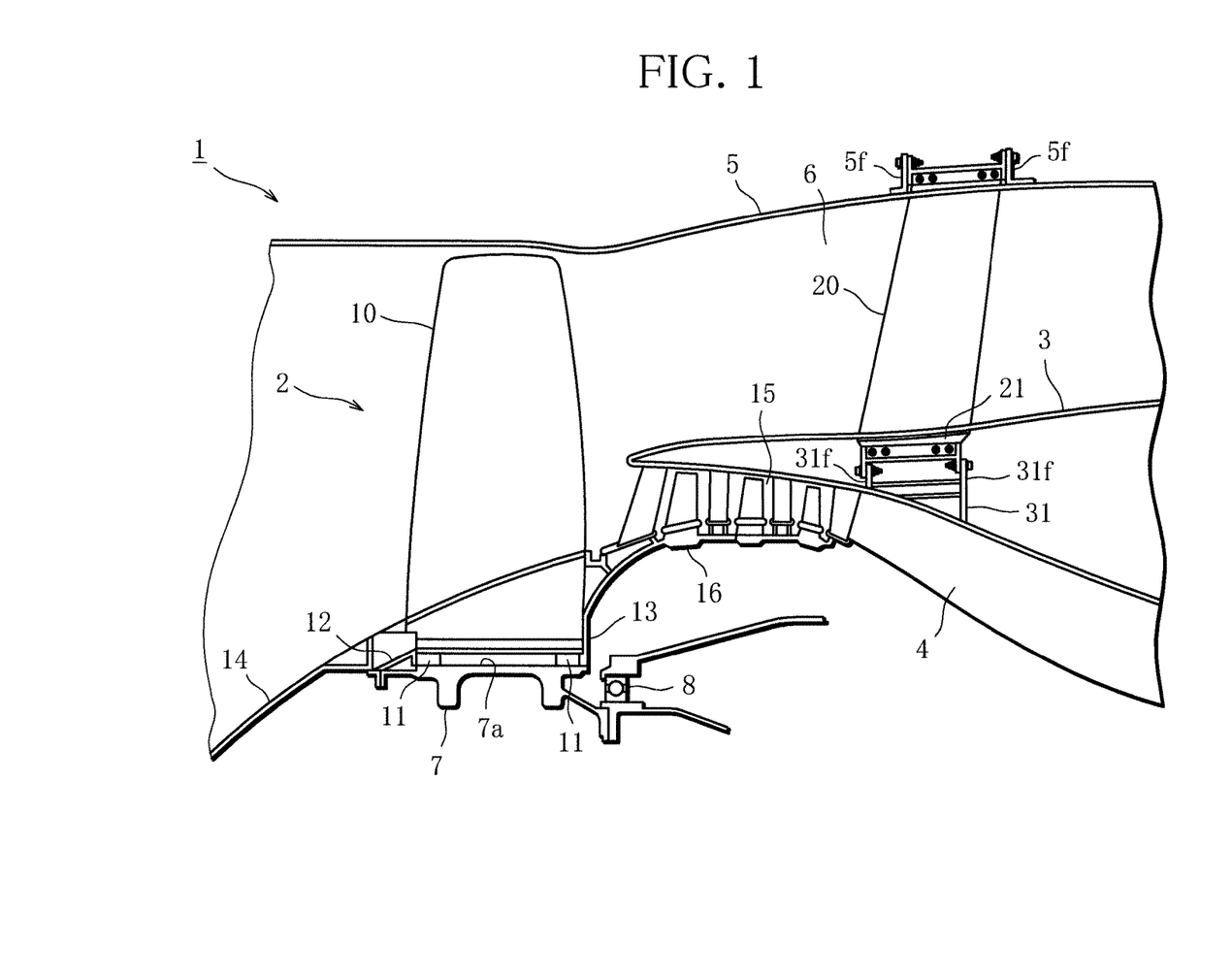
FIG. 1 is an explanatory partial cross-sectional view of a front upper portion of a jet engine to which a coupling part structure for a vane according to one embodiment of the present invention is applied.
Figure 2:
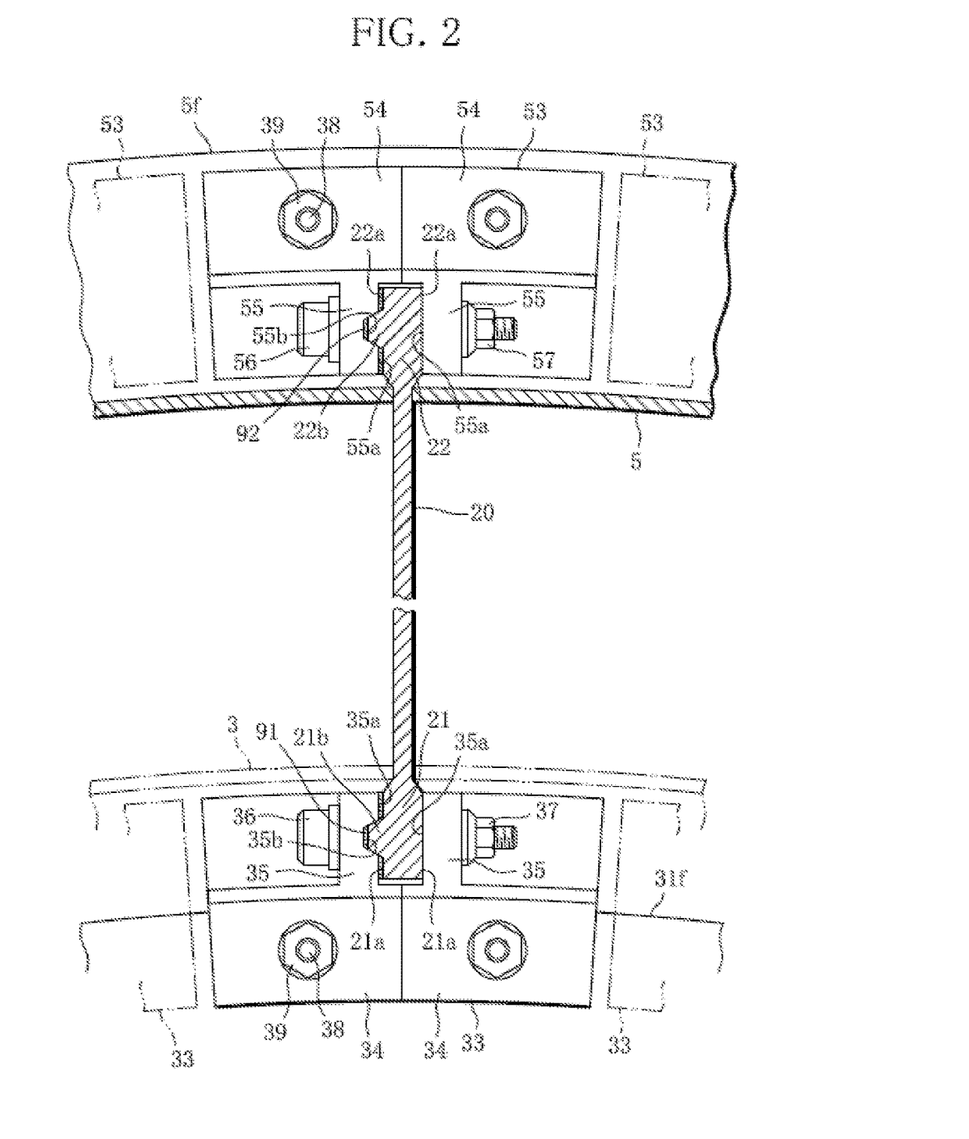
FIG. 2 is an explanatory cross-sectional view of a vane coupling part, FIG. 2 illustrating in detail the coupling part structure for the vane in FIG. 1, the jet engine being observed on its front side.
Figure 3:
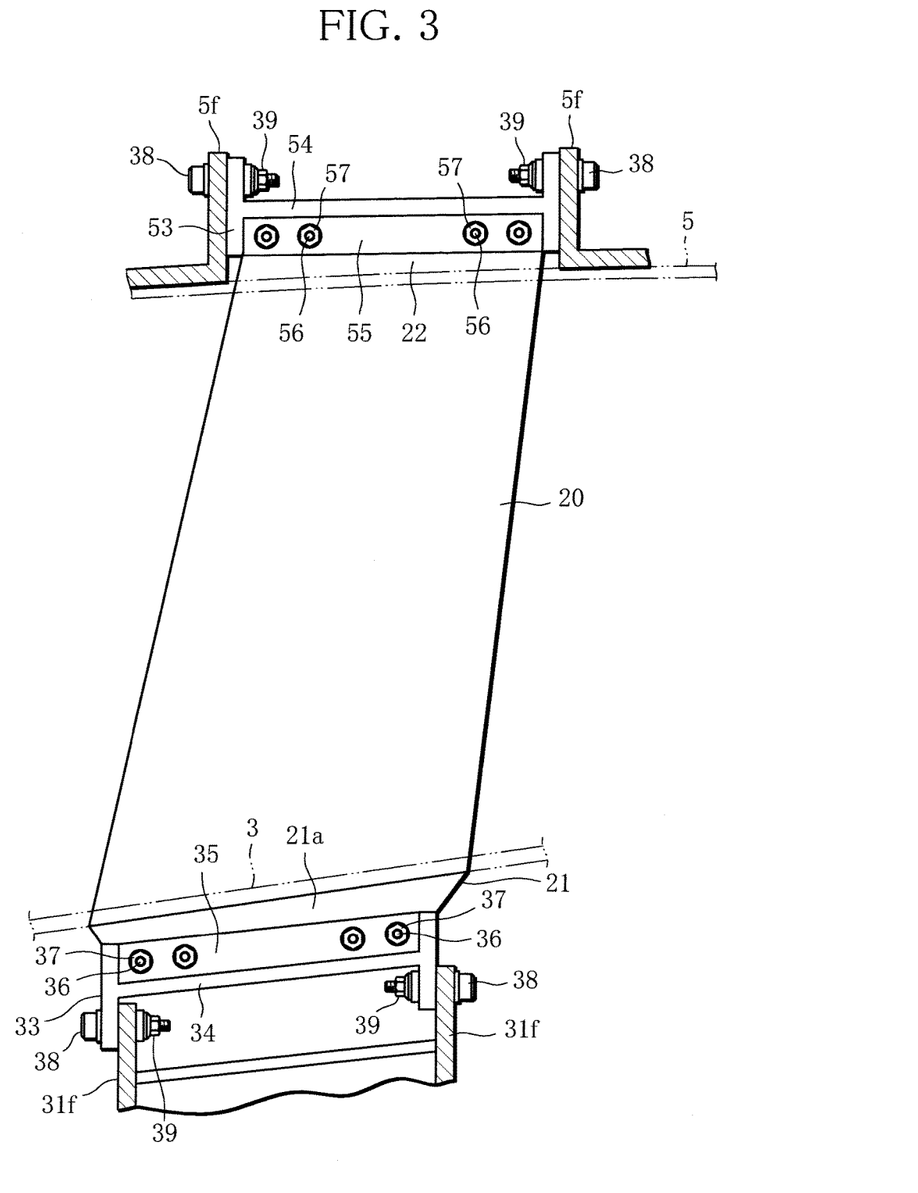
FIG. 3 is an explanatory side view of the vane coupling part, FIG. 3 illustrating in detail the coupling part structure for the vane in FIG. 1.

FIG. 1 to FIG. 3 illustrate one embodiment of a coupling part structure for a vane according to the present invention, and a coupling part of each guide vane as a stator vane constituting a jet engine is described as an example in this embodiment.

As illustrated in FIG. 1, in a jet engine 1, an annular core flow passage 4 is formed on a shaft core side of an engine inner cylinder 3 of an engine main body 2, and a bypass flow passage 6 is formed between the inner circumferential surface of a fan case 5 and the outer circumferential surface of the engine inner cylinder 3 corresponding to an outer portion of the engine main body 2.

In a front portion (on the left side of FIG. 1) of the jet engine 1, a fan disc 7 is rotatably set around the engine shaft core (not illustrated) with the intermediation of a bearing 8. The fan disc 7 is integrally coupled to a turbine rotor of a low-pressure turbine (not illustrated) placed in a back portion (on the right side of FIG. 1) of the jet engine 1.

Further, on the outer circumferential surface of the fan disc 7, a plurality of rotor blades 10 are placed at regular intervals in the circumferential direction with the intermediation of fitting grooves 7a, and spacers 11, 11 are respectively placed in a front portion and a back portion between each rotor blade 10 and each fitting groove 7a. Annular retainers 12, 13 that support the rotor blades 10 are respectively integrally set in the circumferential direction in a front portion and a back portion of the fan disc 7. The retainer 12 in the front portion is integrally coupled to a nose cone 14, and the retainer 13 in the back portion is coaxially and integrally coupled to a rotor 16 of a low-pressure compressor 15 that is adjacently placed downstream of the fan disc 7.

Note that tip shrouds for vibration prevention and aerodynamic performance improvement are respectively coupled between the tips of the plurality of rotor blades 10, and the tip shrouds are not illustrated in FIG. 1.

That is, when the jet engine 1 is operated, the plurality of rotor blades 10 are rotated together with the fan disc 7, whereby air can be introduced into the core flow passage 4 and the bypass flow passage 6.

The jet engine 1 includes a plurality of guide vanes (stator vanes) 20 on the bypass flow passage 6. The plurality of guide vanes 20 are placed at regular intervals around the engine inner cylinder 3, and regulate a swirling flow of air flowing in the bypass flow passage 6. A composite material of: thermosetting resin (such as epoxy resin, phenolic resin, and polyimide resin) or thermoplastic resin (such as polyetherimide, polyether ether ketone, and polyphenylene sulfide); and reinforcement fiber (such as carbon fiber, aramid fiber, and glass fiber) is used as the constituent material of each guide vane 20. The guide vane 20 is formed by, for example, laminating the constituent material in the vane thickness direction or three-dimensionally inweaving the constituent material.

A vane proximal end portion (vane end portion) 21 on a shaft core side of each guide vane 20 is coupled to an attachment flange 31f of a fan frame 31 placed on the engine inner cylinder 3, and a vane distal end portion (vane end portion) 22 on a side farther from the shaft core of the guide vane 20 is coupled to an attachment flange 5f placed on the fan case 5.

In this case, as illustrated in FIG. 2 and FIG. 3, a coupling support member 33 including a pair of divided pieces 34, 34 separated from each other is placed in a coupling part between the vane proximal end portion 21 of the guide vane 20 and the attachment flange 31f, namely, a vane coupling part, and the pair of divided pieces 34, 34 are joined to the vane proximal end portion 21 of the guide vane 20 from both the sides in the vane thickness direction (the left-right direction in FIG. 2). Each of the divided pieces 34, 34 of the coupling support member 33 is made of metal such as an aluminum alloy and a titanium alloy, and is attached to the attachment flange 31f using a bolt 38 and a nut 39.

Opposed walls 35 facing each other are respectively formed on the pair of divided pieces 34, 34 of the coupling support member 33, and the opposed walls 35, 35 are joined to the vane proximal end portion 21 of the guide vane 20 from both the sides in the vane thickness direction.

In this embodiment, one linear protrusion 21b trapezoidal in cross-section is formed on a joint surface 21a on the left side of FIG. 2, of the joint surfaces 21a, 21a of the vane proximal end portion 21 of the guide vane 20. Meanwhile, a groove 35b engaged with the linear protrusion 21b formed in the vane proximal end portion 21 of the guide vane 20 is formed on the divided piece 34 similarly on the left side of FIG. 2, of the two divided pieces 34, 34 constituting the coupling support member 33, namely, an end joint surface 35a of the opposed wall 35 of the divided piece 34 on the left side of FIG. 2.

Then, in this embodiment, the vane proximal end portion 21 of the guide vane 20 is held between the respective opposed walls 35, 35 of the pair of divided pieces 34, 34 by the fastening force that is applied by a bolt 36 and a nut 37 to the pair of divided pieces 34, 34 of the coupling support member 33 from both the sides in the vane thickness direction.

Further, in this embodiment, an adhesive 91 is interposed between the respective opposed walls 35, 35 of the pair of divided pieces 34, 34 of the coupling support member 33 and the vane proximal end portion 21 of the guide vane 20 held between the opposed walls 35, 35.

Meanwhile, a coupling support member 53 including a pair of divided pieces 54, 54 separated from each other is placed also in a coupling part between the vane distal end portion 22 of the guide vane 20 and the attachment flange 5f, namely, a vane coupling part, and the pair of divided pieces 54, 54 are joined to the vane distal end portion 22 of the guide vane 20 from both the sides in the vane thickness direction (the left-right direction in FIG. 2). Each of the divided pieces 54, 54 of the coupling support member 53 is made of metal such as an aluminum alloy and a titanium alloy, and is attached to the attachment flange 5f using the bolt 38 and the nut 39.

Opposed walls 55 facing each other are respectively formed also on the pair of divided pieces 54, 54 of the coupling support member 53, and the opposed walls 55, 55 are joined to the vane distal end portion 22 of the guide vane 20 from both the sides in the vane thickness direction.

Also in this vane coupling part, one linear protrusion 22b trapezoidal in cross-section is formed on a joint surface 22a on the left side of FIG. 2, of the joint surfaces 22a, 22a of the vane distal end portion 22 of the guide vane 20. Meanwhile, a groove 55b engaged with the linear protrusion 22b formed in the vane distal end portion 22 of the guide vane 20 is formed on the divided piece 54 similarly on the left side of FIG. 2, of the two divided pieces 54, 54 constituting the coupling support member 53, namely, an end joint surface 55a of the opposed wall 55 of the divided piece 54 on the left side of FIG. 2.

Then, the vane distal end portion 22 of the guide vane 20 is held between the respective opposed walls 55, 55 of the pair of divided pieces 54, 54 by the fastening force that is applied by a bolt 56 and a nut 57 to the pair of divided pieces 54, 54 of the coupling support member 53 from both the sides in the vane thickness direction.

Further, also in this vane coupling part, an adhesive 92 is interposed between the respective opposed walls 55, 55 of the pair of divided pieces 54, 54 of the coupling support member 53 and the vane distal end portion 22 of the guide vane 20 held between the opposed walls 55, 55.

As described above, in the coupling part structure for the vane according to this embodiment, first, the vane proximal end portion 21 of each guide vane 20 made of the composite material is located between the respective opposed walls 35, 35 of the pair of divided pieces 34, 34 of the coupling support member 33 made of the metal. Further, the linear protrusion 21b formed on the joint surface 21a on the left side of FIG. 2 of the vane proximal end portion 21 is engaged with the groove 35b formed on the joint surface 35a on the left side of FIG. 2 of the coupling support member 33. In this state, the fastening force obtained by the bolts 36 and the nuts 37 is applied to the pair of divided pieces 34, 34 of the coupling support member 33 from both the sides in the vane thickness direction, whereby the vane proximal end portion 21 is held between the respective opposed walls 35, 35 of the pair of divided pieces 34, 34.

Similarly, the vane distal end portion 22 of each guide vane 20 is located between the respective opposed walls 55, 55 of the pair of divided pieces 54, 54 of the coupling support member 53 made of the metal. Further, the linear protrusion 22b formed on the joint surface 22a on the left side of FIG. 2 of the vane distal end portion 22 is engaged with the groove 55b formed on the joint surface 55a on the left side of FIG. 2 of the coupling support member 53. In this state, the fastening force obtained by the bolts 56 and the nuts 57 is applied to the pair of divided pieces 54, 54 of the coupling support member 53 from both the sides in the vane thickness direction, whereby the vane distal end portion 22 is held between the respective opposed walls 55, 55 of the pair of divided pieces 54, 54.

Accordingly, the coupling part structure for the vane according to this embodiment is capable of obtaining a high structural strength while contributing to a reduction in weight of the jet engine 1. In addition, because the coupling strength is a mechanical coupling strength, process management for the coupling part is facilitated compared with the coupling strength in the case of using only an adhesive.

Further, because the vane proximal end portion 21 (vane distal end portion 22) is sandwiched between the respective opposed walls 35, 35 (55, 55) of the pair of divided pieces 34, (54, 54) from both the sides in the vane thickness direction, a turn of the vane proximal end portion 21 (vane distal end portion 22) can be avoided compared with, for example, the case where the vane proximal end portion 21 (vane distal end portion 22) is supported by a wall on one side. As a result, a strong coupling state can be maintained.

Moreover, at the time of assembling of the vane proximal end portion 21 (vane distal end portion 22) and the coupling support member 33 (53), the linear protrusion 21b (22b) of the vane proximal end portion 21 (vane distal end portion 22) is engaged with the groove 35b (55b) of the coupling support member 33 (53), whereby the two components are positioned with each other. Accordingly, this assembling work is facilitated.

Still further, in the coupling part structure for the vane according to this embodiment, the adhesive 91 (92) is interposed between the respective opposed walls 35, 35 (55, 55) of the pair of divided pieces 34, 34 (54, 54) of the coupling support member 33 (53) and the vane proximal end portion 21 (vane distal end portion 22) of the guide vane 20 held between the opposed walls 35, 35 (55, 55), and hence a higher structural strength can be obtained.

Then, the jet engine according to this embodiment adopts the above-mentioned coupling part structure for the vane, and thus achieves both a reduction in weight and an increase in strength.

Figure 4:
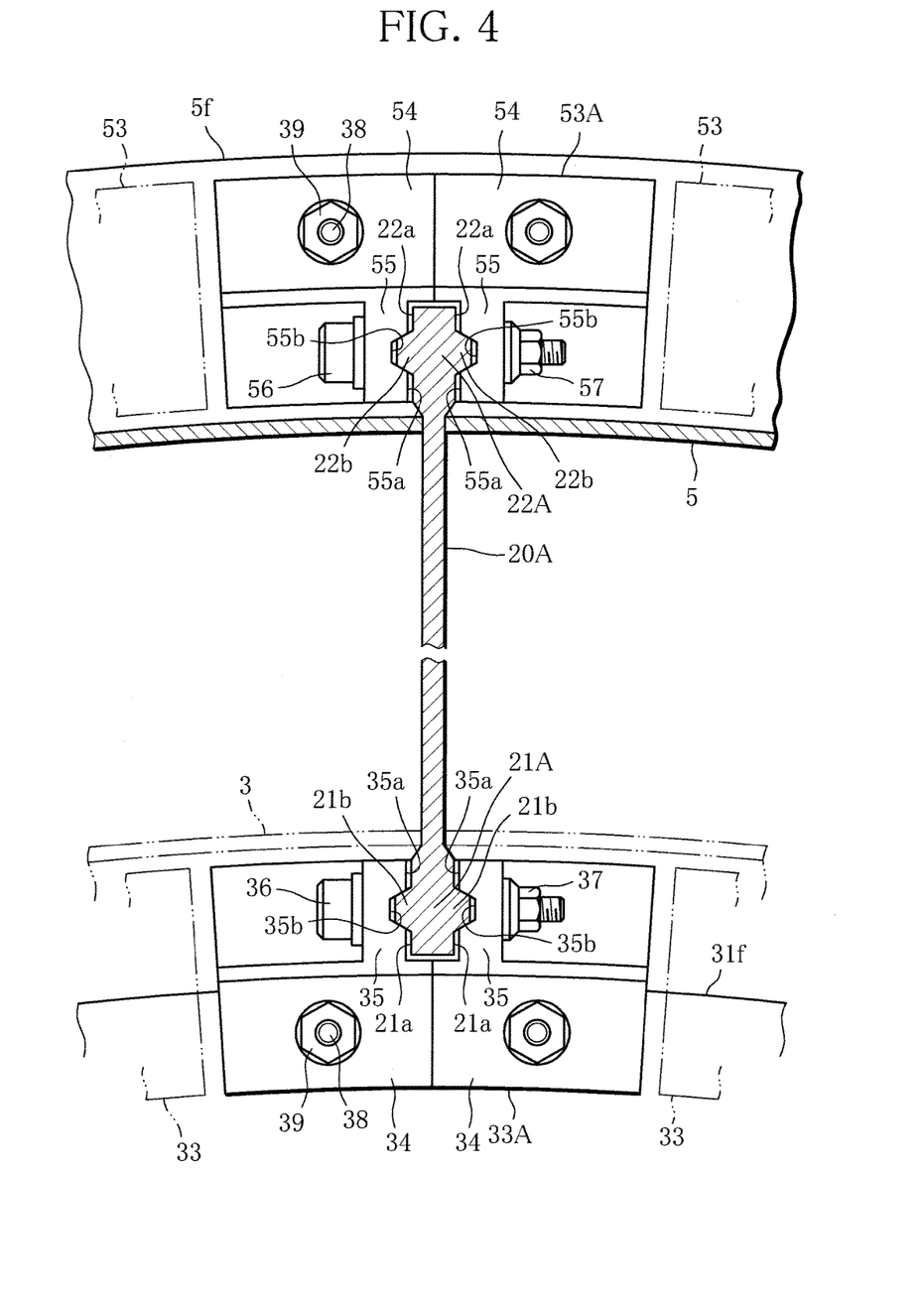
FIG. 4 is an explanatory cross-sectional view illustrating in detail a coupling part structure for a vane according to another embodiment of the present invention, FIG. 4 corresponding to FIG. 2.

FIG. 4 illustrates another embodiment of the coupling part structure for the vane according to the present invention. A coupling part structure for a vane of this embodiment is different from that of the above-mentioned embodiment in that: the linear protrusions 21b (22b) are respectively formed on both the joint surfaces 21a, 21a (22a, 22a) of a vane proximal end portion 21A (vane distal end portion 22A) of each guide vane 20A; and the grooves 35b (55b) that are respectively engaged with the linear protrusions 21b (22b) formed in the vane proximal end portion 21A (vane distal end portion 22A) of the guide vane 20A are respectively formed on both the joint surfaces 35a, 35a (55a, 55a) of the pair of divided pieces 34, 34 (54, 54) of a coupling support member 33A (53A). The coupling part structure for the vane of this embodiment is the same as that of the above-mentioned embodiment in the other configurations.

Accordingly, the coupling part structure for the vane according to this embodiment is capable of obtaining a higher structural strength while contributing to the reduction in weight of the jet engine 1.

In the above-mentioned embodiments, description is given of an example case where the coupling part structure for the vane according to the present invention is applied to the vane coupling part of each guide vane as the stator vane of the jet engine, but the present invention is not limited thereto. For example, as illustrated in FIG. 5, the coupling part structure for the vane according to the present invention can also be applied to a coupling part between: a tip (distal end portion) 62 of each rotor blade 60 of the jet engine; and a tip shroud 85 that is provided to the tip 62 for the purpose of vibration prevention and aerodynamic performance improvement and rotates together with the rotor blade 60.

Figure 5:
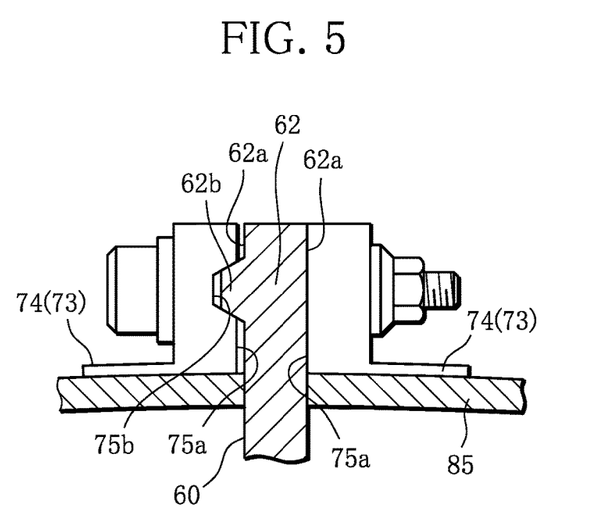
FIG. 5 is an explanatory partial cross-sectional view of a coupling part between a tip of a rotor blade and a tip shroud, FIG. 5 illustrating in detail a coupling part structure for a vane according to still another embodiment of the present invention.

Namely, in this embodiment, a linear protrusion 62b is formed on a joint surface 62a on the left side of FIG. 5, of the joint surfaces 62a, 62a of the distal end portion 62 of the rotor blade 60. Meanwhile, a groove 75b engaged with the linear protrusion 62b formed in the distal end portion 62 of the rotor blade 60 is formed on a Mint surface 75a on the left side of FIG. 5, of the respective joint surfaces 75a, 75a of a pair of divided pieces 74, 74 of a coupling support member 73.

In this way, the coupling part structure for the vane according to the above-mentioned embodiment is also capable of obtaining a higher structural strength while contributing to the reduction in weight of the jet engine.

Figure 6:
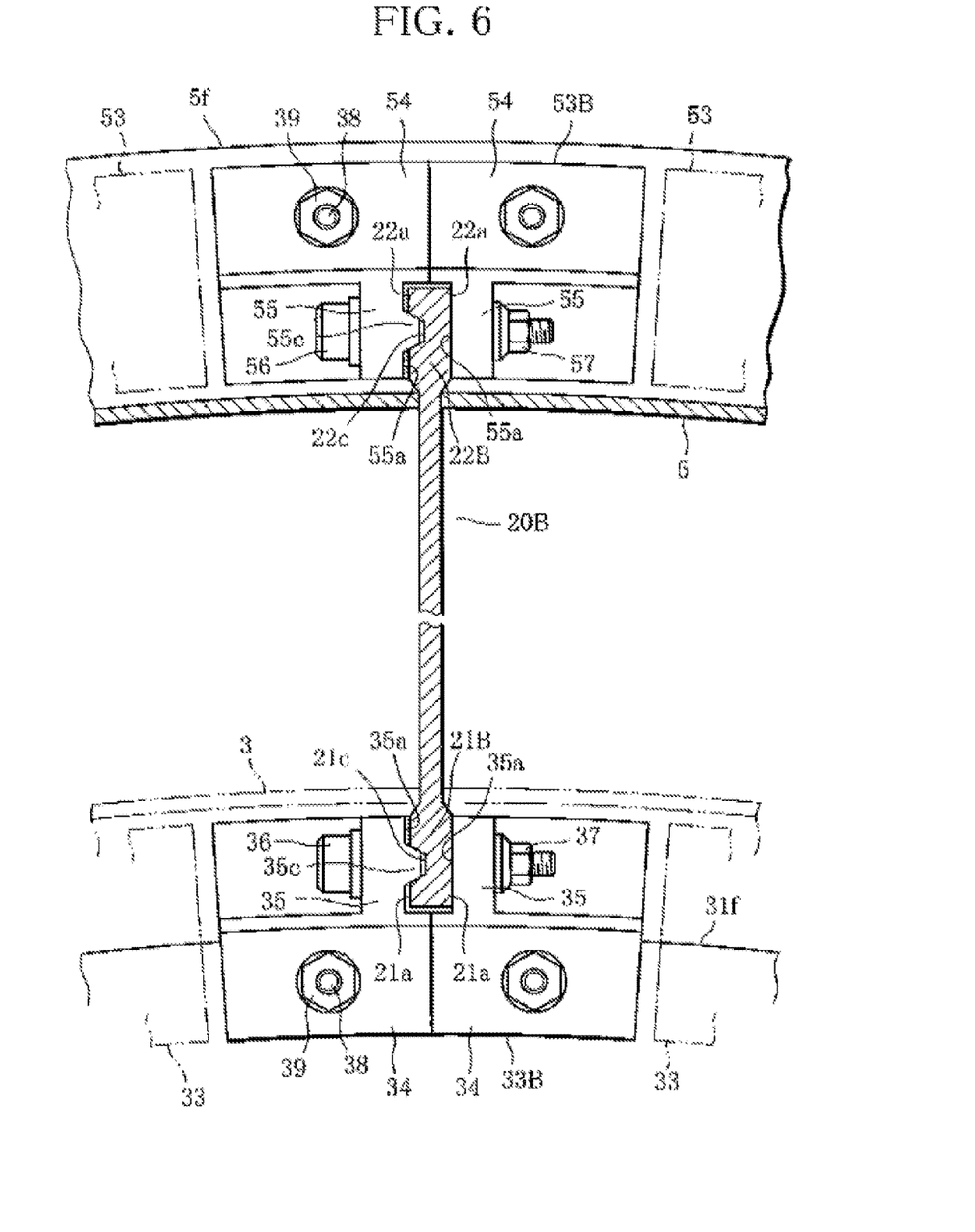
FIG. 6 is an explanatory cross-sectional view illustrating in detail a coupling part structure for a vane according to still another embodiment of the present invention, FIG. 6 corresponds to FIG. 2.

In each of the above-mentioned embodiments relating to the vane end portion of each guide vane, the linear protrusion 21b (22b) is formed in the vane base end portion 21, 21A (vane leading end portion 22, 22A) of each guide vane 20, 20A, and the groove 35b (55b) is formed in the coupling support member 33, 33A (53, 53A), but the present invention is not limited to this configuration. As illustrated in FIG. 6, a groove 21c (22c) may be formed in the vane base end portion 21B (vane leading end portion 22B) of the guide vane 20B, and a linear protrusion 35c (55c) may be formed in the coupling support member 33B (53B).

Further, the number of the linear protrusions 21b (22b) or grooves in the vane proximal end portion 21, 21A (vane distal end portion 22, 22A) of the guide vane 20, 20A (the number of the grooves 35b (55b) or linear protrusions in the coupling support member 33, 33A (53, 53A)) is not limited to one, regardless of whether the linear protrusions or grooves are provided on only one of the joint surfaces or on both of one joint surface and another joint surface. For example, two linear protrusions or grooves may be provided on both of one joint surface and another joint surface. Alternatively, one linear protrusion or groove may be provided on one joint surface, and two linear protrusions or grooves may be provided on another joint surface.

Similarly, in the above-mentioned embodiment relating to the distal end portion of each rotor blade, the linear protrusion 62b is formed in the distal end portion 62 of each rotor blade 60, and the groove 75b is formed in the coupling support member 73, but the present invention is not limited to this configuration. A groove may be formed in the distal end portion 62 of the rotor blade 60, and a linear protrusion may be formed in the coupling support member 73.

Then, the number of the linear protrusions 62b or grooves in the distal end portion 62 of the rotor blade 60 (the number of the grooves 75b or linear protrusions in the coupling support member 73) is not limited to one, regardless of whether the linear protrusions or grooves are provided on only one of the joint surfaces or on both of one joint surface and another joint surface. For example, two linear protrusions or grooves may be provided on both of one joint surface and another joint surface. Alternatively, one linear protrusion or groove may be provided on one joint surface, and two linear protrusions or grooves may be provided on another joint surface.

Moreover, the linear protrusion 21*b*, 22*b*, 62*b* or the groove 35*b*, 55*b*, 75*b* can be trapezoidal, semicircular, triangular, and rectangular in cross-section, but is not limited to these shapes.

The configurations of the coupling part structure for the vane and the jet engine according to the present invention are not limited to the above-mentioned embodiments.

EXPLANATION OF REFERENCE SIGNS 1 jet engine
20, 20A guide vane (stator vane)
21, 21A vane proximal end portion (vane end portion)
21*a*, 22*a*, 62*a* joint surface
21*b*, 22*b*, 62*b* linear protrusion
22, 22A vane distal end portion (vane end portion)
33, 33A, 53, 53A, 73 coupling support member
34, 54, 74 pair of divided pieces
35*a*, 55*a*, 75*a* end joint surface
35*b*, 55*b*, 75*b* groove
36, 56 bolt
37, 57 nut
60 rotor blade
62 distal end portion (vane end portion)

The invention claimed is:

1. A jet engine comprising a vane made of a composite material of thermosetting resin, or thermoplastic resin and reinforcement fiber, a coupling part structure for the vane, a fan frame and a fan case, the coupling part structure comprising a vane coupling part, wherein the vane coupling part includes a coupling support member placed therein, the coupling support member being made of metal and including a pair of divided pieces separated from each other, the pair of divided pieces being joined to an end portion of the vane from a first side and a second side in a vane thickness direction, on at least one of the first side and the second side, a joint surface of the end portion of the vane and a joint surface of the divided piece are formed as follows:

(a) the joint surface of the end portion of the vane has at least one linear protrusion and the joint surface of the divided piece has at least one groove being engaged with the at least one linear protrusion, or (b) the joint surface of the end portion of the vane has at least one groove and the joint surface of the divided piece has at least one linear protrusion being engaged with the at least one groove; and the end portion of the vane is held between the pair of divided pieces of the coupling support member, by fastening force that is applied to the pair of divided pieces of the coupling support member from the first and second sides in the vane thickness direction, wherein each of the pair of divided pieces is attached to an attachment flange of the fan frame or the fan case using an axially extending bolt and a nut.

2. The jet engine according to claim 1, wherein an adhesive is interposed between the pair of divided pieces of the coupling support member and the end portion of the vane held between the pair of divided pieces.

* * * * *